United States Patent Office 3,029,225
Patented Apr. 10, 1962

3,029,225
TEMPERATURE AND SOLVENT RESISTANCE OF ELASTOMERS
Robert P. Cox, Madison, Wis., assignor to Bjorksten Research Laboratories, Inc., Fitchberg, Wis., a corporation of Illinois
No Drawing. Filed Feb. 20, 1956, Ser. No. 566,380
2 Claims. (Cl. 260—46.5)

This invention relates to a process for improving the resistance of elastomers which degrade or deteriorate on exposure to high temperature or on immersion in various solvents.

There is an urgent need for an elastomer which retains its tensile strength and other physical properties after exposure to elevated temperature and after immersion in alkylate fuels or diester type lubricants. Because elastomers are composed essentially of non-polar monomers, polar substituents generally produce a stiffening effect on elastomers. Thus, although polar substituents enhance the solvent resistance of elastomers, decreased flexibility results.

It is an object of this invention to produce elastomers with enhanced solvent resistance without too great a sacrifice in physical properties. It is a further object of this invention to prepare elastomers possessing a non-polar, flexible interior and a highly polar solvent-resistant surface skin. Further objects will become apparent from the following detailed description.

In a preferred embodiment of this invention an elastomer comprised of a compounded alkyl acrylate polymer or copolymer is vulcanized and cut into its final shape. The fabricated elastomer in its finished form is suspended in a hot alkaline solution to hydrolyze the ester groups at the surface. The resulting elastomer retains its non-polar flexible interior and the exterior or skin is converted to a surface highly resistant to polar solvents. The surface produced is protected by COOH groups or COONa groups, depending on whether or not the surface is washed with acid subsequent to its immersion in alkali. The depth of the skin will depend on the length of immersion in alkali.

Any acrylate or methacrylate ester polymer may be used, although the latter will hydrolyze rather slowly. As a hydrolysis catalyst, any strong base may be used and the medium may be alcohol, hydrocarbon, or water. The base may be permitted to penetrate more deeply into the surface to obtain a rather thick but less polar skin (less hydrolysis per unit volume). After the surface has been hydrolyzed, further reaction with diisocyanates, trivalent metal salts, glycols, etc, will yield a cross-linked barrier, while reaction with fluoro alcohols will produce a fluorinated surface.

The following examples are cited to illustrate the novelty and utility of the present invention but do not limit it.

*Example 1*

A copolymer consisting of:

| | Percent |
|---|---|
| Vinyl triethoxy silane | 1.5 |
| Ethyl acrylate | 98.5 | is compounded with 20 parts by weight of Philblack 0, 0.1 parts by weight of stearic acid, 1 part by weight of sulfur and 2 parts by weight of trimene base. After vulcanization of the elastomer, ¼″ x 1½″ strips are immersed in boiling 0.5 N NaOH for varying periods of time. After removal from the NaOH solution the strips are washed with distilled water, dried in air, and their physical properties evaluated both before and after immersion in 70–30 iso-octane-toluene for 96 hours at 65° F. The following summarizes the properties of elastomers treated in the above fashion.

| Immersion Period in NaOH (minutes) | Qualitative Observations of strip after Immersion | Percent Linear Swelling after Immersion | Tensile Strength | | Percent Loss in Tensile Strength |
|---|---|---|---|---|---|
| | | | Before Immersion (p.s.i.) | After Immersion (p.s.i.) | |
| 0 | Surface OK | 11 | 720 | 250 | 65 |
| 30 | Surface OK | 10 | 720 | 460 | 36 |
| 60 | Few surface cracks. | 3 | 720 | 320 | 56 |
| 90 | Many surface cracks. | −1 | 720 | 290 | 60 |

Preferred results are obtained for immersion within the range of 10 to 40 minutes.

In a second series of tests, the strips are washed for 2 minutes in 5% HCl subsequent to NaOH treatment. The surfaces of these strips are free of cracks even after a 60 minute exposure to NaOH. Optimum results; i.e., maximum tensile strength retention and swelling 10% occurs with a 30 minute immersion in NaOH.

Equivalent results are obtained with a concentration of NaOH or KOH of from .2 to 1.5 N, the times of immersion being proportionately longer or shorter.

The initial tensile strength of the samples before immersion is 720 p.s.i. Thus it is seen that the surface is definitely modified by hydrolysis of ester linkages to yield a highly polar surface, that this process continues with extended treatment, and that the optimum treatment is in the vicinity of 30 minutes. Tensile strength lost on immersion in the swelling medium is caused by two opposing factors: (a) swelling of the interior due to solvent penetration of the skin layer and (b) crack formation in the skin layer because of lack of extensibility caused by excessive numbers of polar carboxyl groups on the surface.

*Example 2*

The samples are immersed as in Example 1 but after immersion in sodium hydroxode solution, they are washed for two minutes in 5% HCl. The surfaces are crack-free even after 60 minutes exposure to sodium hydroxide and the swelling on immersion in 70–30 iso-octane-toluene is equivalent to that of the samples in Example 1.

It is believed that treatment with HCl converts the highly polar salt groups to the less polar carboxyl groups, which are more extensible, more flexible but yet impervious to 70–30 iso-octane-toluene.

*Example 3*

75 parts of methyl methacrylate are co-polymerized with 25 parts of methyl acrylate and cast into sheet form. The sheet is cut into strips which are immersed in ½ normal sodium hydroxide solution (boiling) for 0–120 minutes, and then immersed in 70–30 iso-octane-toluene blend. The percent linear swelling after 100 hours is found to decrease with increasing time of immersion in the boiling sodium hydroxide, and the tensile strength retention is found to increase to a maximum followed by a gradual decrease. The optimum combination of swelling and tensile strength is found to occur at 70 minutes' immersion in sodium hydroxide.

When the sodium hydroxide treated samples are washed for 2 minutes with HCl, no decrease in tensile strength retention is noted at the extended periods of immersion in sodium hydroxide and the range of minimum swelling coupled with maximum tensile strength retention is found to occur in the range 75–120 minutes' immersion.

*Example 4*

Example 1 is repeated but instead of boiling sodium hydroxide, boiling solutions of phenyl trimethyl ammonium hydroxide, tetraethyl ammonium hydroxide, and tetraethanol ammonium hydroxide are used as the treating solution. The results are similar to those described in Example 1, but on extended periods of time the surface of the strips becomes slightly discolored.

*Example 5*

Methyl methacrylate is polymerized and cast into a sheet. When exposed to boiling caustic solution for 100 hours, no swelling in iso-octane-toluene blend is noted.

*Example 6*

95% methyl methacrylate and 5% methyl acrylate are polymerized into a casting syrup and cast into a sheet which is further cured. This sheet is immersed in ethylene glycol containing 10% phenyl trimethyl ammonium hydroxide and is heated at 80° C. under vacuum for 18 hours. The scratch resistance of the resultant sheet is increased by a factor of 3 and swelling in polymethylmethacrylate solvents is greatly decreased. When the material is refluxed in acetone and ethylene dichloride it is found that the surface of the sheet material is crosslinked but the interior of the sheet is still thermoplastic and soluble in these solvents. It is believed that ester interchange occurs at the surface, yielding a cross-linked surface structure.

The above examples further illustrate this invention but the invention is not restricted to these examples and modifications may be made without departing from the spirit of the invention.

I claim as my invention:

1. A process for preparing a synthetic rubber body having a non-polar flexible interior and a highly polar solvent resistant skin comprising the steps of providing a vulcanizate by reacting a copolymer of a monomeric mixture consisting of 98.5 parts by weight of an alkyl acrylate and 1.5 parts by weight of a vinyl triethoxy silane with a vulcanizing agent, immersing the vulcanizate in a boiling alkali metal hydroxide having a concentration of from .2 to 1.5 normality for a period of about 10 to 40 minutes.

2. A process for preparing a synthetic rubber body having a non-polar flexible interior and a highly polar solvent resistant skin comprising the steps of providing a vulcanizate by reacting a copolymer of a monomeric mixture consisting of 98.5 parts by weight of an alkyl acrylate and 1.5 parts by weight of a vinyl triethoxy silane with a vulcanizing agent, immersing the vulcanizate in a boiling sodium hydroxide solution having a concentration of about .2 to 1.5 normality for a period of from 10 to 40 minutes.

References Cited in the file of this patent

UNITED STATES PATENTS

| | | |
|---|---|---|
| 2,532,583 | Tyran | Dec. 5, 1950 |
| 2,538,273 | Rhines | Jan. 16, 1951 |
| 2,581,832 | Blume | Jan. 8, 1952 |
| 2,649,439 | Brown | Aug. 18, 1953 |
| 2,716,638 | Cohen et al. | Aug. 30, 1955 |
| 2,742,378 | Te Grotenhuis | Apr. 17, 1956 |
| 2,774,697 | Koblitz | Dec. 18, 1956 |

FOREIGN PATENTS

| | | |
|---|---|---|
| 789,166 | France | Oct. 24, 1935 |
| 457,696 | Canada | June 28, 1949 |

OTHER REFERENCES

Dawson et al.: Rubber, Physical and Chem. Properties, 1935, p. 206, pub. by The Research Assn. of British Rubber Manufacturers, Croydon, England.

Vinyl and Related Polymers (Schidknecht), 1952, Wiley and Sons, p. 248 relied on.